United States Patent
Chen et al.

(10) Patent No.: US 8,406,914 B2
(45) Date of Patent: Mar. 26, 2013

(54) INJECTION MOLDING CONTROLLER, MANUFACTURING METHOD THEREOF, AND INJECTION MOLDING SYSTEM USING THE SAME

(75) Inventors: Mi-Chien Chen, Taipei Hsien (TW); Chun-Jen Lin, Taipei Hsien (TW); Jin-Bao Huang, Shenzhen (CH)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 378 days.

(21) Appl. No.: 12/826,971

(22) Filed: Jun. 30, 2010

(65) Prior Publication Data
US 2011/0160895 A1 Jun. 30, 2011

(30) Foreign Application Priority Data
Dec. 29, 2009 (CN) .......................... 2009 1 0312523

(51) Int. Cl.
*G06F 19/00* (2006.01)
(52) U.S. Cl. ....................................... 700/204; 715/771
(58) Field of Classification Search .................. 700/204, 700/200, 203, 306, 10; 715/771
See application file for complete search history.

(56) References Cited

U.S. PATENT DOCUMENTS

| | | | | | |
|---|---|---|---|---|---|
| 4,674,053 | A | * | 6/1987 | Bannai et al. | 700/197 |
| 4,823,274 | A | * | 4/1989 | Kiya et al. | 700/203 |
| 5,229,952 | A | * | 7/1993 | Galloway et al. | 700/200 |
| 5,470,218 | A | * | 11/1995 | Hillman et al. | 425/144 |
| 6,275,741 | B1 | * | 8/2001 | Choi | 700/200 |
| 6,980,882 | B2 | * | 12/2005 | Yamazaki et al. | 700/200 |
| 7,346,425 | B2 | * | 3/2008 | Nishizawa et al. | 700/200 |
| 8,116,903 | B2 | * | 2/2012 | Hsu et al. | 700/204 |
| 2006/0068049 | A1 | * | 3/2006 | Nishizawa | 425/145 |

* cited by examiner

*Primary Examiner* — Kidest Bahta
(74) *Attorney, Agent, or Firm* — Altis Law Group, Inc.

(57) ABSTRACT

An injection molding controller controls an injection molding apparatus and peripheral devices of the injection molding apparatus. The injection molding controller includes an integral interface and a storage unit. The integral interface includes an injection molding control page and peripheral control pages. The integral interface shows the injection molding control page and the peripheral control pages simultaneously. The storage unit communicates with the integral interface and stores data related to the integral interface. The disclosure further provides a method for manufacturing the injection molding controller and an injection molding system using the injection molding controller.

11 Claims, 3 Drawing Sheets

INJECTION MOLDING CONTROLLER, MANUFACTURING METHOD THEREOF, AND INJECTION MOLDING SYSTEM USING THE SAME

BACKGROUND

1. Technical Field

The present disclosure generally relates to an injection molding controller, a method for manufacturing the injection molding controller, and an injection molding system using the injection molding controller.

2. Description of Related Art

Injection molding produces parts from thermoplastic and thermosetting plastic materials, wherein material is fed into a heated barrel, mixed, and injected into a mold cavity where it cools and hardens to the configuration of the mold cavity. Recently, injection molding has been widely used to manufacture various parts from small components to body panels of cars.

Peripheral devices, such as dryers, mold heat controllers, temperature controllers, and other devices, function in cooperation with the injection molding apparatus. The dryer dries raw material for molding, the mold heat controller controls the temperature of the mold, and the temperature controller controls a temperature of the molten material. Because the injection molding process is complex, it is necessary to set a large number of control parameters, such as mold clamping force, injection pressure, drying temperature, drying speed, and mold temperature.

The injection apparatus and peripheral devices generally provide original control interfaces to configure various control parameters received from input devices, such as mice, keyboards, and touch panels, and are conveyed to control devices of the injection apparatus and the peripheral device. The original control parameters are pre-defined when the injection apparatus and the peripheral device are manufactured and configured with graphic elements providing corresponding control parameters.

However, the features of the original control interfaces of the injection apparatus and peripheral device are specific to the apparatus' manufacturer, such that familiarity with one original control interface is non-transferable when operating another apparatus, which increases training costs and the burden on manpower. In addition, different apparatuses must be chosen, affecting manufacturing efficiency.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout several views, and all the views are schematic.

DETAILED DESCRIPTION

Figure 1:
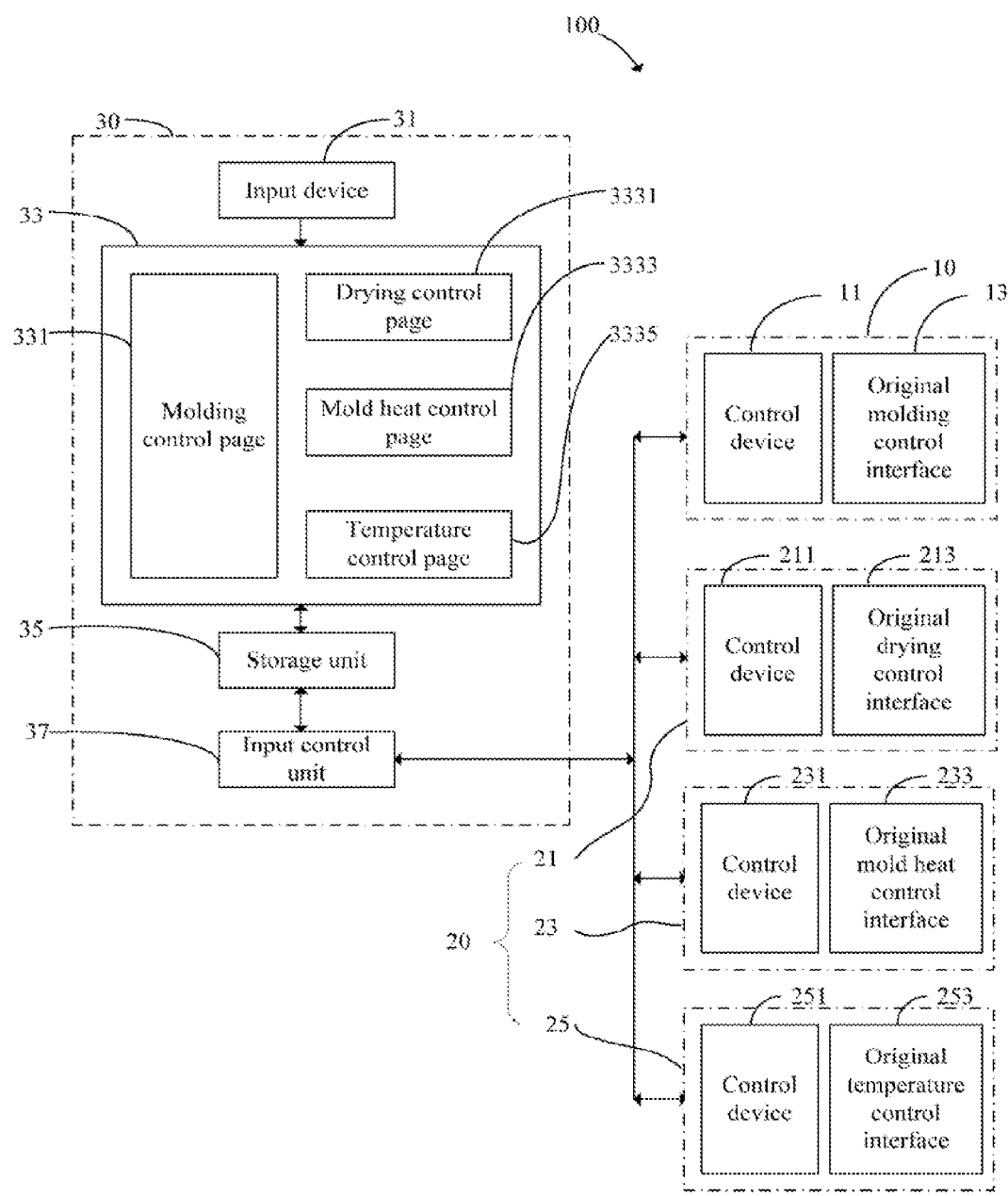
FIG. 1 is a block diagram of an embodiment of an injection molding system, utilizing an integral interface therein.

Referring to FIG. 1, an injection molding system 100 includes an injection molding apparatus 10, an assistant apparatus group 20, and an injection molding controller 30. The assistant apparatus group 20 includes a plurality of peripheral devices.

The injection molding apparatus 10 includes a control device 11 and an original molding control interface 13. The original molding control interface 13 is configured with graphic elements corresponding to the control parameters for controlling operations such as closing the mold, locking the mold, injection, maintaining pressure, and opening the mold. The control parameters, input by mouse, keyboard, or touch panel, are converted to control signals with which the control device 11 controls the injection molding apparatus 10. The control device 11 is also capable of returning operating parameters to the original molding control interface 13.

The assistant apparatus group 20 includes a plurality of peripheral devices such as a dryer 21, a mold heat controller 23, and a temperature controller 25.

The dryer 21 includes a control device 211 and an original drying control interface 213. The original drying control interface 213 of the dryer 21 is configured with graphic elements corresponding to the control parameters for control the drying rate and drying time. The control device 211 controls the operations of the dryer 21 according to the control parameters, and the control device 211 feeds the operating parameters back to the original drying control interface 213.

The mold heat controller 23 includes a control device 231 and an original mold heat control interface 233. The original mold heat control interface 233 of the mold heat controller 23 is configured with graphic elements corresponding to the control parameters for controlling the heating temperature and heating time. The control device 231 controls the operations of the mold heat controller 23 according to the control parameters, and the control device 231 feeds the operating parameters back to the original mold heat control interface 233.

The temperature controller 25 includes a control device 251 and an original temperature control interface 253. The original temperature control interface 253 of the temperature controller 23 is configured with graphic elements corresponding to the control parameters for controlling the temperature and time. The control device 251 controls the operations of the temperature controller 25 according to the control parameters, and the control device 251 feeds the operating parameters back to the original temperature control interface 253.

The injection molding controller 30 includes an input device 31, an integral interface 33, a storage unit 35, and an input control unit 37.

The input device 31 may be a mouse, a keyboard, or a touch panel.

Figure 2:
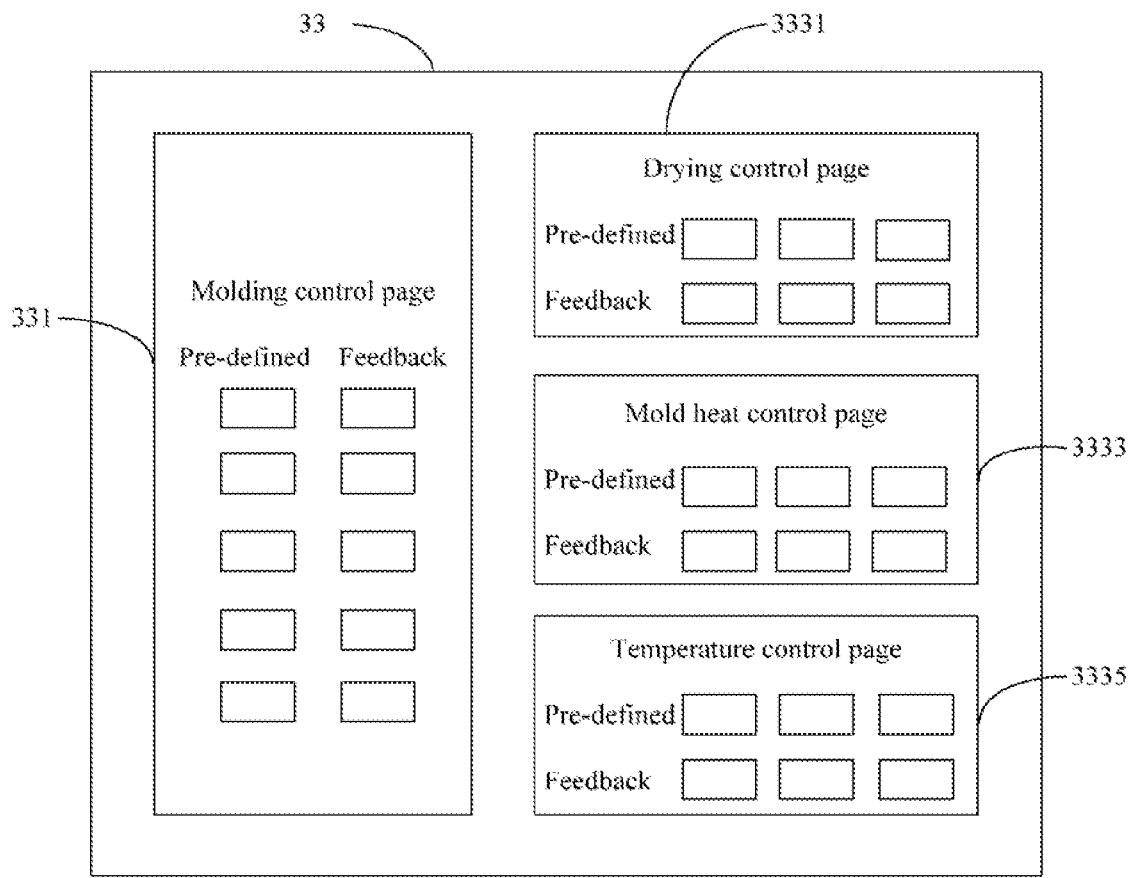
FIG. 2 is a schematic view of the injection molding controller of FIG. 1.

Also referring to FIG. 2, the integral interface 33 includes a molding control page 331 and a plurality of peripheral control pages, such as a drying control page 3331, a mold heat control page 3333, and a temperature control page 3335. The molding control page 331, the drying control page 3331, the mold heat control page 3333, and the temperature control page 3335 are shown by the integral interface 33 at the same time, and each includes a pre-defined region for displaying pre-defined parameters and a feedback region for displaying feedback data.

The storage unit 35 stores the data related to the integral interface 33.

The input control unit 37 communicates the control device 11 of the injection molding apparatus 10, the control device 211 of the dryer 21, the control device 231 of the mold heat controller 23, and the control device 251 of the temperature controller 25 to the integral interface 33, such that data is conveyed between the integral interface 33 and the apparatuses. Therefore, the control devices 11, 211, 231, 251 control the operations of the injection molding apparatus 10, the dryer 21, the mold heat controller 23, and the temperature controller 25, respectively.

In the injection molding system 100, the dryer 21, the mold heat controller 23, and the temperature controller 25 are connected to the injection molding apparatus 10. The dryer 21 dries raw material for molding, the mold heat controller 23 controls the temperature of an injection mold (not shown) of the injection molding apparatus 10, and the temperature controller 25 controls the temperature of material in a mold cavity (not shown) of the injection molding apparatus 10.

In use, drying rate, drying time, and other control parameters are input to the drying control page 3331, heat temperature, cooling temperature, corresponding time, and other related control parameters are input to the mold heat control page 3333, heat temperature, cooling temperature, corresponding time, and other control parameters are input to the temperature control page 3335, and time and driving speed of closing the mold, locking the mold, injection, maintaining pressure, and opening mold are input to the molding control page 331. The control parameters related to the integral interface 33 are stored in the storage unit 35 and conveyed to the input control unit 37. The input control unit 37 identifies and conveys corresponding control parameters to the control device 11 of the injection molding apparatus 10, the control device 211 of the dryer 21, the control device 231 of mold heat controller 23, and the control device 251 of the temperature controller 25, respectively. Therefore, the control devices 11, 211, 231, 251 control the operations of the injection molding apparatus 10, the dryer 21, the mold heat controller 23, and the temperature controller 25. The control parameters are shown in the original control interfaces of the injection molding apparatus 10, the dryer 21, the mold heat controller 23, and the temperature controller 25.

During injection molding, the operating parameters of the apparatus are fed back to the original drying control interface 13, the original drying control interface 213, the original mold heat control interface 233, and the original temperature control interface 253, respectively. The feedback data of the apparatuses is conveyed to the input control unit 37 via the control devices 11, 211, 231, 251, and ultimately to feedback regions of the integral interface 33.

The operation can be monitored from the feedback data, by comparing the feedback data with the pre-defined parameters, whereby if differences between the pre-defined parameters and the feedback data are notable, the pre-defined parameters will be adjusted to decrease the differences.

Figure 3:
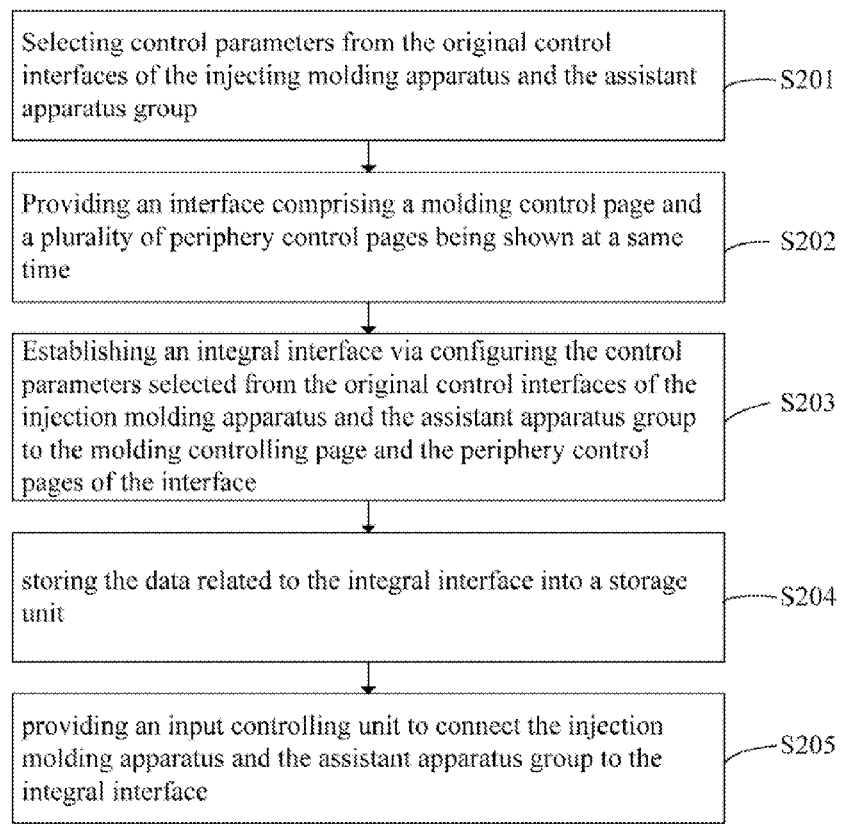
FIG. 3 is a flowchart of a forming method of the injection molding controller of FIG. 1.

FIG. 3 shows a method of manufacturing the injection molding controller 30. The steps are not limited in the illustrated order and some steps may be performed simultaneously or partially simultaneously.

In step S201, control parameters are selected from the original control interfaces of the injecting molding apparatus 10 and the assistant apparatus group including a dryer 21, a mold heat controller 23, and a temperature controller 25.

In step S202, an interface is provided. The interface includes a molding control page 331 and a plurality of peripheral control pages shown at the same time. The peripheral control pages include a drying control page 3331, a mold heat control page 3333, and a temperature control page 3335.

In step S203, an integral interface 33 is established via configuration of the control parameters selected from the original control interfaces of the injection molding apparatus 10 and the assistant apparatus group 20 to the molding control page 331 and the peripheral control pages of the interface.

In step S204, data related to the integral interface 33 is stored in a storage unit 35.

In step S205, an input control unit 37 is provided to connect the injection molding apparatus 10 and the assistant apparatus group 20 to the integral interface 33, such that the integral interface 33 is enabled to control the injection molding apparatus 10 and the assistant apparatus group 20, and the feedback data is conveyed to the integral interface 33 by the input control unit 37.

In the method disclosed, because the control parameters of the peripheral devices of the assistant apparatus group 20 are similar, a standard integral interface 33 of the injection molding controller 30 can be established and easily operated.

In the injection molding system 100, numerous control parameters are integrated to the same interface, that is the integral interface 33, eliminating the need to shuttle among different apparatuses, easing labor and avoiding misoperation, while increasing convenience of operation.

In the injection molding controller 30, a plurality of control pages are shown at the same time, such that real-time supervision of the varied parameters of the different apparatuses and the influence among different apparatuses is achieved.

The pre-defined regions and the feedback regions of the integral interface 33 provide a possibility of real-time supervision of the operation statuses of the apparatuses, such that abnormities therein can be discovered and removed in time.

Alternatively, the peripheral devices may include other machines, such as pressure control apparatus, wherein the integral interface 33 further includes the control page related to the pressure control apparatus.

Finally, while various embodiments have been described and illustrated, the disclosure is not to be construed as limited thereto. Various modifications can be made to the embodiments by those skilled in the art without departing from the true spirit and scope of the disclosure as defined by the appended claims.

What is claimed is:

1. An injection molding controller for an injection molding apparatus and an assistant apparatus group comprising a plurality of peripheral devices, the injection molding controller comprising:

an integral interface comprising an injection molding control page and a plurality of peripheral control pages, wherein the integral interface shows the injection molding control page and the peripheral control pages simultaneously, a plurality of control parameters are set in the integral interface; and a storage unit communicating with the integral interface and storing data of the integral interface, and an input control unit, wherein the control parameters of the integral interface are stored in the storage unit and conveyed to the input control unit, the input control unit identifies and conveys the corresponding control parameters to the injection molding apparatus and the assistant apparatus.

2. The injection molding controller of claim 1, wherein the input control unit connects the injection molding apparatus and the assistant apparatus group to the integral interface, such that data can be conveyed among the integral interface, the injection molding apparatus, and the assistant apparatus group.

3. The injection molding controller of claim 1, wherein the assistant apparatus group comprises a dryer, a mold heat controller, and a temperature controller, and the plurality of peripheral control pages comprise a drying control page, a temperature control page, and a mold heat control page.

4. The injection molding controller of claim 1, wherein the integral interface shows a plurality of pre-defined parameters and feedback data.

5. The injection molding controller of claim 1, wherein the injection molding control page and the peripheral control pages are standardization pages.

6. A method for manufacturing an injection molding controller for an injection molding apparatus and an assistant apparatus group comprising a plurality of peripheral devices, each of the injection molding apparatus and the peripheral devices of the assistant apparatus group comprising an original control interface configured with control parameters, the method comprising:

selecting control parameters from the original control interfaces of the injecting molding apparatus and the assistant apparatus group;

providing an interface comprising a molding control page and a plurality of peripheral control pages shown at the same time;

establishing an integral interface via configuring the control parameters selected from the original control interfaces of the injection molding apparatus and the assistant apparatus group to the molding control page and the peripheral control pages of the interface;

storing the data of the integral interface into a storage unit; and providing an input control unit to connect the injection molding apparatus and the assistant apparatus group to the integral interface to enable the storing of control parameters of the integral interface in the storage unit and conveying to the input control unit, the input control unit identifies and conveys the corresponding control parameters to the injection molding apparatus and the assistant apparatus to control the injection molding apparatus and the peripheral devices, and convey the feedback data to the integral interface.

7. The method for forming an injection molding controller of claim 6, wherein the peripheral control pages comprise a drying control page, a mold heat control page, and a temperature control page.

8. The method for forming an injection molding controller of claim 7, wherein selection of the control parameters from the original control interfaces of the injecting molding apparatus and the assistant apparatus group further comprises selecting similar parameters to establish a standard integral interface.

9. An injection molding system, comprising:

an injection molding apparatus comprising an original molding control interface and a control device, the original molding control interface configured with original parameters according to which the control device controls the injection molding apparatus;

an assistant apparatus group comprising a plurality of peripheral devices, each peripheral device comprising an original control interface and a control device, the original control interface configured with original parameters according to which the control device controls the peripheral devices; and an injection molding controller comprising an integral interface, a storage unit, and an input control unit, wherein the integral interface shows a molding control page and a plurality of peripheral control pages simultaneously, and the input control unit connects the storage devices of the injection molding apparatus and the peripheral devices to the integral interface, the control parameters of the integral interface are stored in the storage unit and conveyed to the input control unit, the input control unit identifies and conveys the corresponding control parameters to the injection molding apparatus and the assistant apparatus, such that the data can be conveyed among the integral interface, the injection molding apparatus, and the peripheral devices.

10. The injection molding system of claim 9, wherein the peripheral devices comprise a dryer, a mold heat controller, and a temperature controller, and the peripheral control pages of the integral interface comprise a drying control page, a mold heat control page, and a temperature control page.

11. The injection molding system of claim 10, wherein the integral interface comprises pre-defined regions configuring with pre-defined parameters, and feedback regions configuring with feedback data.

\* \* \* \* \*